(12) United States Patent
Kitta et al.

(10) Patent No.: US 11,077,594 B2
(45) Date of Patent: Aug. 3, 2021

(54) MOVABLE PLATEN, OPENING/CLOSING APPARATUS AND MOLDING APPARATUS

(71) Applicant: Toshiba Kikai Kabushiki Kaisha, Tokyo-to (JP)

(72) Inventors: Hideaki Kitta, Numazu (JP); Noriyuki Sasaki, Numazu (JP); Masato Kinoshita, Numazu (JP)

(73) Assignee: Shibaura Machine Co., Ltd., Tokyo (JP)

( * ) Notice: Subject to any disclaimer, the term of this patent is extended or adjusted under 35 U.S.C. 154(b) by 536 days.

(21) Appl. No.: 15/551,787

(22) PCT Filed: Feb. 18, 2016

(86) PCT No.: PCT/JP2016/054650
§ 371 (c)(1),
(2) Date: Aug. 17, 2017

(87) PCT Pub. No.: WO2016/133149
PCT Pub. Date: Aug. 25, 2016

(65) Prior Publication Data
US 2018/0022001 A1    Jan. 25, 2018

(30) Foreign Application Priority Data
Feb. 18, 2015   (JP) .............................. JP2015-029733

(51) Int. Cl.
*B29C 45/17*   (2006.01)
*B29C 33/20*   (2006.01)
(Continued)

(52) U.S. Cl.
CPC .......... *B29C 45/1761* (2013.01); *B22D 17/22* (2013.01); *B22D 17/26* (2013.01);
(Continued)

(58) Field of Classification Search
CPC ........ B29C 45/1761; B29C 2045/1763; B29C 45/661; B29C 45/681
See application file for complete search history.

(56) References Cited

U.S. PATENT DOCUMENTS

2016/0023391 A1* 1/2016 Nishizawa .......... B29C 45/1744
425/575

FOREIGN PATENT DOCUMENTS

DE    10 2014 016 129    5/2015
JP    2004-330449    11/2004
(Continued)

OTHER PUBLICATIONS

Translation of JP-2007001047-A.*
(Continued)

*Primary Examiner* — Nahida Sultana
*Assistant Examiner* — Asha A Thomas
(74) *Attorney, Agent, or Firm* — DLA Piper LLP US

(57) ABSTRACT

A movable platen according to the present invention includes: a mold clamping platen 42 having a projecting portion 62 in a mold closing direction-side surface; a mold mounting platen 44 mounted to the projecting portion 62 of the mold clamping platen 42; and a guide mechanism 50 fixed to the mold clamping platen 42 and supporting the mold mounting platen 44. Only the mold clamping platen 42 is fixed to the guide mechanism 50, while the mold mounting platen 44 is not fixed but placed on platen surface support portions 52.

3 Claims, 3 Drawing Sheets

(51) Int. Cl.
  *B22D 17/26* (2006.01)
  *B22D 17/22* (2006.01)
  *B29C 45/66* (2006.01)

(52) U.S. Cl.
  CPC ............ *B22D 17/263* (2013.01); *B29C 33/20* (2013.01); *B29C 45/1744* (2013.01); *B29C 45/661* (2013.01); *B29C 2045/662* (2013.01)

(56) References Cited

FOREIGN PATENT DOCUMENTS

| | | |
|---|---|---|
| JP | 2006-168271 | 6/2006 |
| JP | 2006168271 A * | 6/2006 |
| JP | 2007-001047 | 1/2007 |
| JP | 2007001047 A * | 1/2007 |
| JP | 2008-093978 | 4/2008 |
| JP | 2009-101528 | 5/2009 |
| JP | 2009-262514 | 11/2009 |
| JP | 2010-000658 | 1/2010 |
| JP | 2010-012623 | 1/2010 |
| JP | 2012-020415 | 2/2012 |
| JP | 2012-112445 | 6/2012 |
| JP | 2012-245744 | 12/2012 |
| JP | 2013-212627 | 10/2013 |
| WO | WO 98-41380 | 9/1998 |

OTHER PUBLICATIONS

Translation of JP-2006168271-A.*
International Search Report issued in PCT/2016/054650 dated Apr. 5, 2016.
Written Opinion issued in PCT/2016/054650 dated Apr. 5, 2016.
International Preliminary Report on Patentability issued in PCT/2016/054650 dated Aug. 22, 2017.
English Language Abstract of JP 2006-168271 published Jun. 29, 2006.
English Language Abstract of JP 2007-001047 published Jan. 11, 2007.
English Language Abstract of JP 2012-020415 published Feb. 2, 2006.
English Language Abstract of JP 2009-101528 published May 14, 2009.
English Language Abstract of JP 2004-330449 published Nov. 25, 2004.
English Language Abstract of JP 2010-012623 published Jan. 21, 2010.
English Language Abstract of JP 2010-000658 published Jan. 7, 2010.
German Office Action in DE Application No. 112016000803 dated May 22, 2019.
Japanese Office Action in Application JP Application No. 2016-028173 dated Jul. 2, 2019.
Chinese Office Action dated Oct. 29, 2018 in Application No. 2016800111162.

* cited by examiner

MOVABLE PLATEN, OPENING/CLOSING APPARATUS AND MOLDING APPARATUS

CROSS REFERENCE TO RELATED APPLICATIONS

This application is a U.S. National Stage Application of International Application No. PCT/JP2016/054650 filed Feb. 18, 2016, which claims priority from Japanese Patent Application No. 2015-029733 filed Feb. 18, 2015. The entirety of all the above-listed applications are incorporated herein by reference.

TECHNICAL FIELD

Embodiments of the present invention relate to a movable platen and an opening/closing apparatus for use in a molding apparatus, such as an injection molding machine or a die-casting machine, and to a molding apparatus.

BACKGROUND OF THE INVENTION

A mold clamping apparatus (opening/closing apparatus) used in a molding machine, such as an injection molding machine or a die-casting machine, includes a fixed platen to which a fixed mold is to be mounted, and a movable platen to which a movable mold is to be mounted. A toggle link-type mold clamping apparatus is known as a typical molding clamping apparatus. The toggle link-type mold clamping apparatus moves a movable platen back and forth through extension/contraction of a power-driven toggle link mechanism, thereby closing, clamping and opening a mold.

In the case of a toggle link-type mold clamping apparatus, unlike a direct pressure-type mold clamping apparatus, a movable platen, to which a mold clamping force is directly applied from a toggle link mechanism, is likely to deform upon mold clamping, resulting in a failure to perform high-accuracy mold clamping. To address the problem, a movable platen has been proposed which is divided into a mold clamping platen directly connected to a toggle link mechanism, and a mold mounting platen to which a movable mold is to be mounted.

A toggle link-type mold clamping apparatus is also known which employs a guide mechanism, provided on a base frame, to support a movable platen consisting of a mold clamping platen and a mold mounting platen, thereby enhancing the linearity of the movement of the movable platen (see, e.g., patent documents 1 and 2).

PRIOR ART DOCUMENTS

Patent Documents

Patent document 1: Japanese Patent Laid-Open Publication No. 2006-168271
Patent document 2: Japanese Patent Laid-Open Publication No. 2007-001047

SUMMARY OF THE INVENTION

In a conventional movable platen composed of a mold clamping platen and a mold mounting platen, a raised movable mold-mounting surface is formed in the center of the mold clamping platen. Therefore, if the mold clamping platen is distorted by a large mold clamping force generated by a toggle link mechanism, the distortion will be hardly transmitted to the mold mounting platen.

However, when a movable mold is mounted to the mold mounting platen of the conventional movable platen, the weight of the mold generates a moment in such a direction as to tilt the mold clamping platen in the mold closing direction.

The mold clamping platen and the mold mounting platen are, in most cases, simply placed and supported on a guide mechanism and, in addition, no tie bar is inserted into the mold clamping plate. Therefore, the moment acting on the mold clamping platen can lift up and float the mold clamping platen and tilt the movable mold.

Such floating of the mold clamping platen may prevent mold clamping with uniform force, resulting in a lowering of the quality of a molded product.

The present invention has been made in view of the above problems in the prior art. It is therefore an object of the present invention to provide a movable platen including a mold clamping platen and a mold mounting platen, which can effectively prevent the mold clamping platen from floating when a movable mold is mounted to the mold mounting platen, thereby making it possible to perform high-accuracy mold clamping. It is also an object of the present invention to provide an opening/closing apparatus and a molding apparatus, each having the movable platen.

In order to achieve the object, the present invention provides a movable platen comprising: a mold clamping platen having a projecting portion in a mold closing direction-side surface; a mold mounting platen mounted to the projecting portion of the mold clamping platen; and a guide mechanism fixed to the mold clamping platen and supporting the mold mounting platen, wherein only the mold clamping platen is fixed to the guide mechanism, while the mold mounting platen is not fixed but placed on a platen surface support portion of the guide mechanism.

The present invention also provides an opening/closing apparatus comprising: the above movable platen to which one mold of a pair of molds is to be mounted; a fixed platen to which the other mold is to be mounted in a position opposite the one mold; a pressure-receiving platen connected to the fixed platen via tie bars; and an opening/closing mechanism connecting the pressure-receiving platen and the movable platen and which opens/closes the molds by moving the movable platen back and forth.

Further, the present invention provides a molding apparatus comprising the above opening/closing apparatus.

DESCRIPTION OF EMBODIMENTS

Embodiments of the movable platen, the opening/closing apparatus and the molding apparatus according to the present invention will now be described with reference to the attached drawings.

Figure 1:
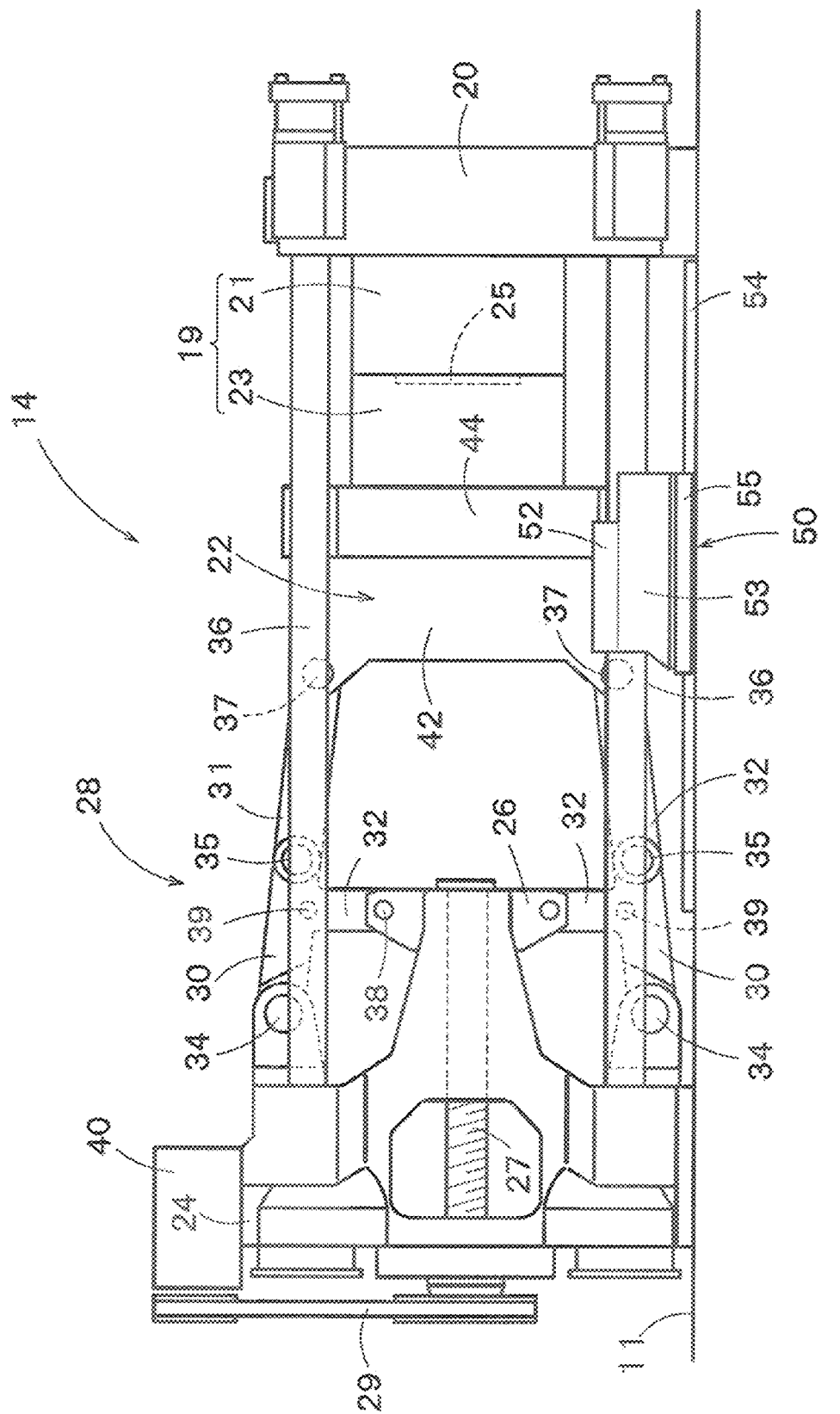
FIG. 1 is a side view schematically showing a mold clamping apparatus provided with a movable platen according to an embodiment of the present invention.

FIG. 1 is a side view schematically showing a mold clamping apparatus according to an embodiment in which the present invention is applied to a mold clamping apparatus of an injection molding machine (molding apparatus).

In FIG. 1, reference numeral 14 denotes the entire mold clamping apparatus. A fixed die plate (fixed platen) 20 is fixed at one end of a frame 11 of the mold clamping apparatus (opening/closing apparatus) 14. A link housing (pressure-receiving platen) 24 is disposed at the other end of the frame 11. A movable die plate (movable platen) 22, located between the fixed die plate 20 and the link housing 24, is movably installed on the frame 11. A fixed mold 21 is mounted to the fixed die plate 20, while a movable mold 23 is mounted to the movable die plate 22. The fixed mold (the other mold, one mold) 21 and the movable mold (one mold, the other mold) 23 constitute a mold 19. A cavity 25 for a molded product is formed in the mold 19, i.e. when the fixed mold 21 and the movable mold 23 are closed.

The fixed die plate 20 and the link housing 24 are connected via a plurality of (e.g. four) tie bars 36. When clamping the mold 19 after closing the movable mold 23 and the fixed mold 21, the tie bars 36 are subjected to a mold clamping force exerted by a toggle link mechanism (opening/closing mechanism, mold opening/closing mechanism, mold clamping mechanism) 28.

As shown in FIG. 1, the toggle link mechanism 28 includes, for example, a pair of upper toggle links and a pair of lower toggle links, each toggle link consisting of a first link 30, a second link 31 and a third link 32. FIG. 1 shows one of the upper toggle links and one of the lower toggle links. All the toggle links have the same construction.

One end of the first link 30 is connected to the link housing 24 via a toggle pin 34. The other end of the first link 30 is connected to one end of the second link 31 via a toggle pin 35. The other end of the second link 31 is connected to a mold clamping platen 42, constituting the movable die plate 22, via a toggle pin 37.

The movable die plate 22 of this embodiment includes, for example, the mold clamping platen 42 connected to the toggle link mechanism 28, and a mold mounting platen 44 to which the movable mold 23 is to be mounted.

In FIG. 1, reference numeral 26 denotes a crosshead connected to the toggle link mechanism 28.

One end of the third link 32 is connected to the crosshead 26 via a toggle pin 38. The other end of the third link 32 is connected to the first link 30 via a toggle pin 39.

In this embodiment the link housing 24 is provided with a servo motor (drive) 40 as a drive source for the toggle link mechanism 28. A not-shown nut portion of a ball screw mechanism, which converts rotation of the servo motor 40 into a linear movement and transmits the movement to the toggle link mechanism 28, is provided in the center of the crosshead 26. A ball screw 27 is in engagement with the nut portion. Rotation of the servo motor 40 is transmitted to the ball screw 27 via a timing belt 29.

Movement of the crosshead 26 in the mold opening/closing directions is guided by a not-shown guide which is supported by arm portions 24a extending from the link housing 24 in the mold closing direction.

The first links 30 and the second links 31 of the toggle link mechanism 28, shown in FIG. 1, are in an extended state. When the crosshead 26 moves rightward, the first links 30 and the second links 31 extend, thereby advancing the movable die plate 22 and closing the mold. A mold clamping force is generated by further pressing the movable mold 23 against the fixed mold 21 in the mold closing direction after contact of the movable mold 23 with the fixed mold 21.

On the other hand, when the crosshead 26 moves leftward in FIG. 1, the first links 30 and the second links 31 are bent by the third links 32, whereby the movable die plate 22 moves backward and opens the mold 19.

Figure 2:
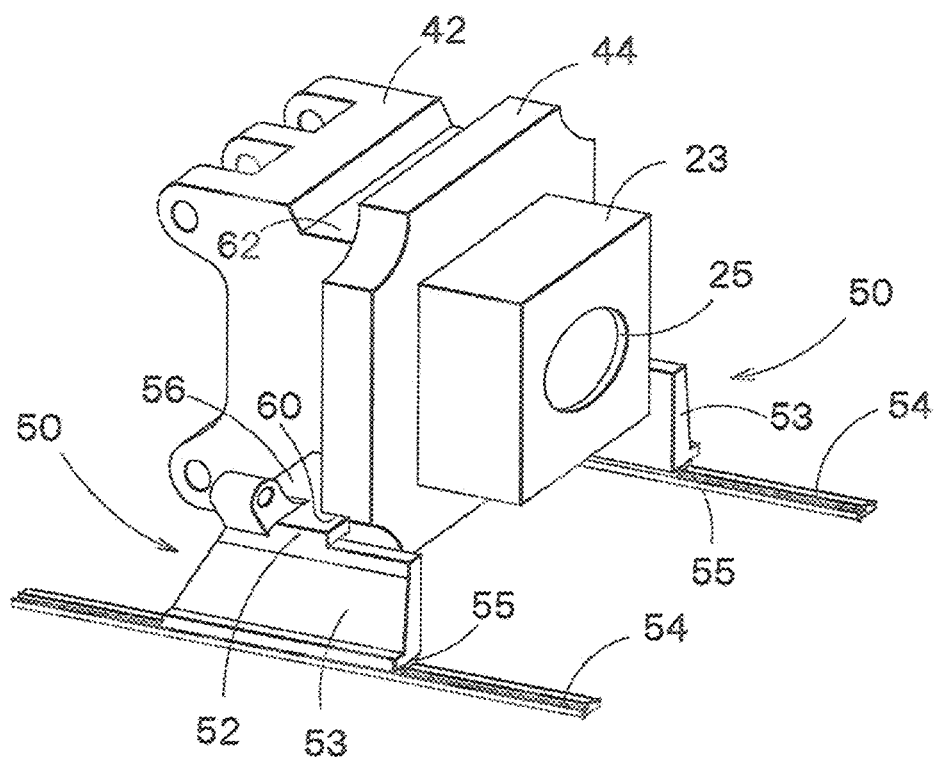
FIG. 2 is a perspective view of a movable platen according to a first embodiment.

FIG. 2 shows a linear guide device 50 for supporting the movable die plate 22 and guiding its movement.

The linear guide device 50 (guide device, guide mechanism) 50 includes, for example, a pair of platen surface support portions (support portions) 52 which support the movable die plate 22 and which are disposed on both sides of the mold mounting surface of the mold mounting platen 44 of the movable die plate 22, a leg portion 53 constructed integrally with each platen surface support portion 52, and a linear guide (linear motion guide) 55 held on the leg portion 53 and which slides on a guide rail (rail) 54 laid on a base 11.

Each linear guide 55 is, for example, comprised of a linear bearing having rollers or steel balls which roll on a rolling surface of the guide rail 54. It is also possible to use a linear bearing that slides on a sliding surface with the use of lubrication oil. The linear guide 55 is in engagement with the guide rail 54 e.g. having a T-shaped cross section. Therefore, if a moment acts on the linear guide device 50 due to the weight of the movable mold 23, the linear guide device 50 will not be detached from the guide rail 54 as will be described below. This prevents floating of the mold clamping platen 42.

The mold clamping platen 42 of the movable die plate 22 has a projecting portion 62 to which the mold mounting platen 44 is fixed. The mold mounting platen 44 has a larger size than the projecting portion 62. The mold clamping platen 42 and the mold mounting platen 44 are supported on the platen surface support portions 52 in the following different manners.

Figure 3:
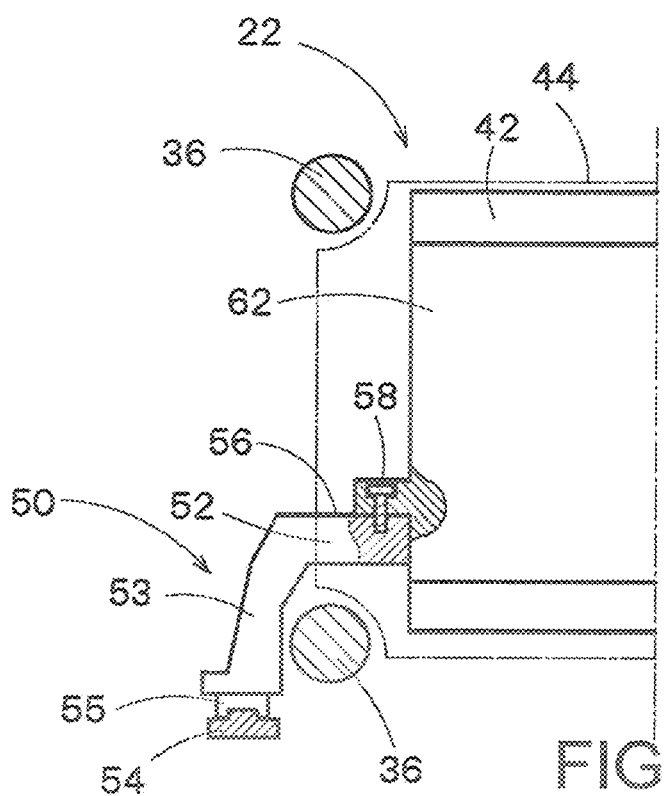
FIG. 3 is a diagram showing a supporting structure for a mold clamping platen according to the first embodiment.

In this embodiment, part of the upper surface of each platen surface support portion 52 serves as a mold clamping platen support surface 56 on which the lower surface of the mold clamping platen 42 is seated. As shown in FIG. 3, the mold clamping platen 42 is fastened (fixed) to the platen surface support portions 52 (more specifically the mold clamping platen support surfaces 56) e.g. by using fastening members such as bolts 58.

On the other hand, as shown in FIG. 2, the mold mounting platen 44 has a larger lateral size than the projecting portion 62 of the mold clamping platen 42, and thus projects from the side surfaces of the mold clamping platen 42. A horizontal seating surface 60 is formed in a stepped portion provided in the lower surface of the mold mounting platen 44. A horizontal mold mounting platen support surface, on which the seating surface 60 of the mold mounting platen 44 is seated, is formed in an area, located outside the mold clamping platen support surface 56, of each platen surface support portion 52.

A stepped portion need not necessarily be provided in the lower surface of the mold mounting platen 44. Thus, the mold mounting platen 44 may be placed on the platen surface support portions 52, with a flat lower surface of the mold mounting platen 44 in contact with the upper surfaces of the platen surface support portions 52.

In the embodiment illustrated in FIG. 2, the mold mounting platen 44 has a large lateral size and is placed directly on the platen surface support portions 52; however, the present invention is not limited to such a construction. Thus, in a possible case, the mold mounting platen 44 has a small lateral size and does not reach the platen surface support portions 52. It is possible in that case to mount brackets to the lower surface of the mold mounting platen 44 or provide projecting portions projecting from the lower surface, and to place the mold mounting platen 44 on the platen surface support portions 52 via the brackets or the projecting portions.

Unlike the mold clamping platen 42, the mold mounting platen 44 is not fastened (fixed) to the platen surface support portions 52 by means of fastening members such as bolts, but simply placed (supported) on the platen surface support portions 52. The mold mounting platen 44 is detachably mounted to the projecting portion 62 of the mold clamping platen 42.

The action and the effects of this embodiment will now be described with reference to FIGS. 1 through 3.

Referring to FIG. 2, when the movable mold 23 is mounted to the mold mounting platen 44 of the movable die plate 22, a moment acts on the mold clamping platen 42 due to the weight of the mold 23. The moment acts in such a manner as to tilt the mold clamping platen 42 toward the movable mold 23.

If the mold clamping platen 42 and the mold mounting platen 44 are both simply placed (supported) on the platen surface support portions 52 of the linear guide device 50, the mold clamping platen 42 will float and the movable mold 23 will tilt due to the moment that acts on the mold clamping platen 42.

According to the movable die plate 22 of this embodiment, on the other hand, the mold clamping platen 42 is fastened to the mold clamping platen support surfaces 56 of the linear guide device 50 by using fastening members such as bolts 58. This can prevent the mold clamping platen 42 from floating even though the above moment acts on it, and can prevent the movable mold 23 from tilting or almost falling over.

The amount of deformation of the mold clamping platen 42 upon clamping of the mold 19 is larger in its upper portion than that of its lower portion which is fastened (fixed) to the mold clamping platen support surfaces 56, whereby distortion occurs in the mold clamping platen 42. However, since the mold clamping platen 42 is connected, in the projecting portion 62, to the mold mounting platen 44, the distortion is intrinsically hardly transmitted to the mold mounting platen 44.

Unlike the mold clamping platen 42, the mold mounting platen 44 is not fastened or fixed, but simply placed on the platen surface support portions 52. Therefore, the lower side of the mold mounting platen 44 also deforms freely upon clamping of the mold 19, leading to a small difference in deformation between the upper and lower portions of the mold mounting platen 44. This makes the distribution of pressure on the mold 19 uniform, leading to enhancement of the quality of a molded product.

By thus fastening (fixing) the mold clamping platen 42 to the platen surface support portions 52 of the linear guide device 50 while not fastening (fixing) but simply placing (supporting) the mold mounting platen 44 on the platen surface support portions 52, it becomes possible to prevent floating of the mold clamping platen 42 and to reduce deformation of the mold mounting platen 44. This makes it possible to perform mold clamping stably with high accuracy, thereby enhancing the quality of a molded product.

Figure 4:
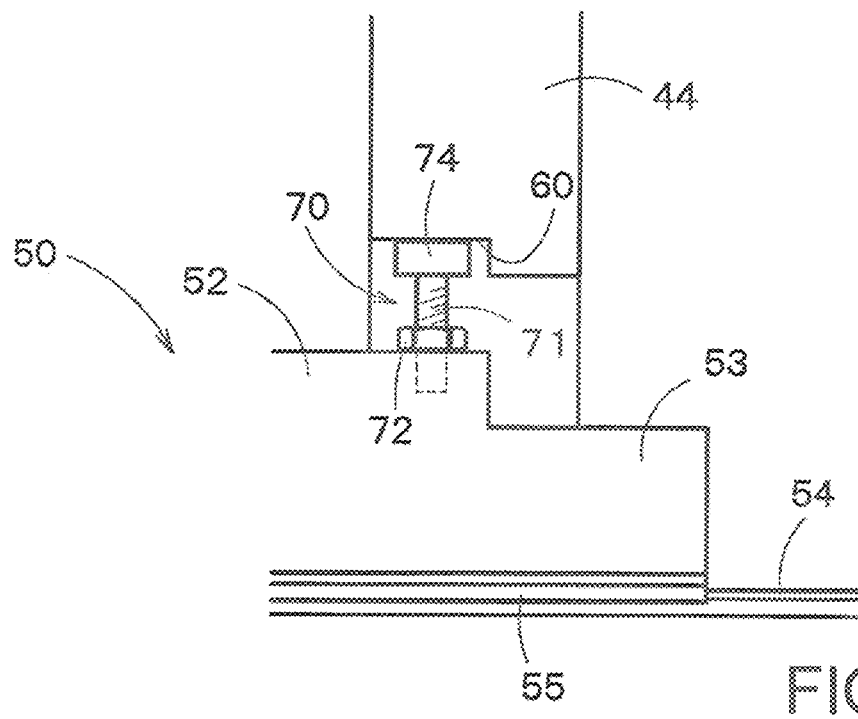
FIG. 4 is a diagram showing a height adjustment mechanism according to a second embodiment.
Figure 5:
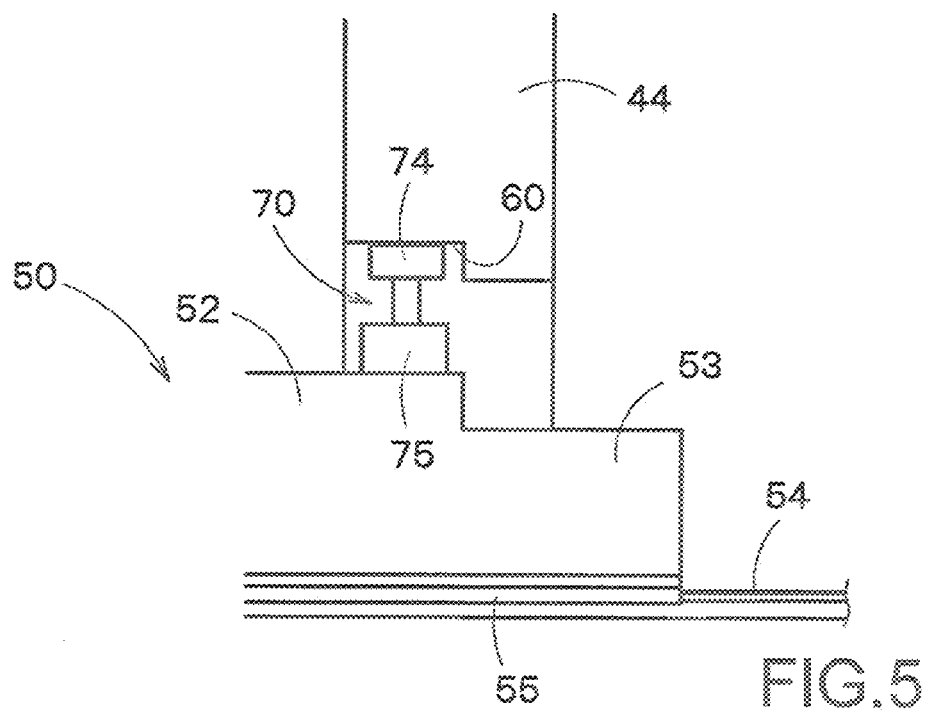
FIG. 5 is a diagram showing a height adjustment mechanism according to a variation of the second embodiment.

FIGS. 4 and 5 illustrate a second embodiment of the present invention.

The second embodiment illustrated in FIG. 4 differs from the first embodiment in that the platen surface support portions 52 of the linear guide device 50 of the first embodiment are each provided with a mechanism capable of adjusting the height of the mold mounting platen 44. Therefore, a description will be given solely of the different feature of the second embodiment, and a detailed description of the same features as the first embodiment will be omitted.

As shown in FIG. 4, in the second embodiment, an adjustment mechanism 70 capable of adjusting the height of the mold mounting platen 44 is mounted (provided, installed) in each of the platen surface support portions 52 of the linear guide device 50, disposed on both sides of the mold mounting surface of the mold mounting platen 44.

The adjustment mechanism 70 is, for example, comprised of a bolt 71, a nut 72 and a mold mounting platen support member 74. A lower portion of the bolt 71 is screwed into a female thread formed in the platen surface support portion 52. The nut 72 is in engagement with the bolt 71. The mold mounting platen support member 74, which contacts the seating surface 60 of the mold mounting platen 44 and supports the mold mounting platen 44, is coupled to the top of the bolt 71.

The adjustment mechanism 70 can change the height of the mold mounting platen support member 74 by rotating the bolt 71 while keeping the nut 72 loose. Thus, the adjustment mechanism 70 not only can support the mold mounting platen 44 but can also adjust the height of the mold mounting platen 44. The mold mounting platen 44 can be held at an adjusted height by tightening the nut 72 after the adjustment.

The second embodiment, in which the platen surface support portions 52 are provided with the adjustment mechanisms 70 capable of adjusting the height of the mold mounting platen 44, can have the effect of being capable of adjusting the parallelism of the molds (parallelism of the movable mold 23 with respect to the fixed mold 21) besides the effects described above with reference to the first embodiment.

FIG. 5 illustrates a variation of the second embodiment. Instead of the adjustment mechanism 70 comprised of the bolt 71, the nut 72 and the mold mounting platen support member 74, the variation uses an adjustment mechanism 70 comprised of a jack 75 and the mold mounting platen support member 74. According to this variation, the height of the mold mounting platen 44 can be adjusted by means of the jack 75. This variation can achieve the same effects as the second embodiment illustrated in FIG. 4.

Another variation of the second embodiment uses an adjustment mechanism 70 comprised of a wedge (not shown) and the mold mounting platen support member 74. According to this variation, the height of the mold mounting platen 44 can be adjusted by means of the wedge. This variation can also achieve the same effects as the second embodiment illustrated in FIG. 4.

Though in the above-described second embodiment the adjustment mechanism 70 is provided in each platen surface support portion 52, the present invention is not limited to such a construction. Thus, it is possible to fix the adjustment mechanism 70 to the lower surface of the mold mounting platen 44, and to adjust the height of the mold mounting platen 44 with the adjustment mechanism 70 in contact with each platen surface support portion 52. Thus, the presence of the adjustment mechanism 70 between the mold mounting platen 44 and each platen surface support portion 52 is all that is needed.

Though in the above-described embodiments the mold clamping platen 42 and the linear guide device 50 are constructed as separate structures, the mold clamping platen 42 may be constructed integrally with the linear guide device 50. Thus, the mold clamping platen 42 may also have the function of the linear guide device 50. Also in this case, as with the first embodiment of the present invention, the mold mounting platen 44 is mounted to the projecting portion 62 of the mold clamping platen 42, and the mold mounting platen 44 is not fixed but supported in an unconstrained state on the platen surface support portions 52 of the linear guide device 50.

While the movable platen, the opening/closing apparatus and the molding apparatus according to the present invention have been described with reference to the embodiments in which they are applied in the injection molding machine, the present invention can also be applied in other molding apparatuses such as a die-casting machine.

The invention claimed is:

1. A movable platen comprising:
a mold clamping platen having a projecting portion in a mold closing direction-side surface;
a mold mounting platen mounted to the projecting portion of the mold clamping platen and configured to project from side surfaces of the mold clamping platen; and
a guide mechanism fixed to the mold clamping platen and supporting the mold mounting platen, the guide mechanism comprising:
   a pair of platen surface support portions,
   a pair of leg portions constructed integrally with the pair of the platen surface support portions respectively,
   a pair of linear motion guides held on the pair of the leg portions to prevent floating of the mold clamping platen, and
   an adjustment mechanism configured to adjust the height of the mold mounting platen, the adjustment mechanism provided between the platen surface support portion of the guide mechanism and the mold on both sides of the mold mounting surface of the mold mounting platen,
wherein only the mold clamping platen is fixed to the guide mechanism by using fixing members, while the mold mounting platen is not fixed but placed on the pair of the platen surface support portions of the guide mechanism.

2. The movable platen according to claim 1, wherein the mold clamping platen is constructed integrally with the guide mechanism supporting the mold mounting platen.

3. The movable platen according to claim 1, wherein the mold clamping platen is constructed integrally with the guide mechanism supporting the mold mounting platen.

* * * * *